United States Patent [19]

Sneed et al.

[11] 3,995,355
[45] Dec. 7, 1976

[54] LAYING OF FLEXIBLE PIPE

[75] Inventors: Robert C. Sneed; Joseph C. Young, both of Odessa, Tex.

[73] Assignee: Fas-Line Sales & Rentals, Inc., Odessa, Tex.

[22] Filed: June 30, 1975

[21] Appl. No.: 591,540

[52] U.S. Cl. ............................ 29/157 R; 29/429; 242/86.5 R; 242/86.6; 242/86.7; 254/134.3 R; 61/105

[51] Int. Cl.² ............... B65H 49/00; B65H 69/08; B65G 67/12; B65G 67/24

[58] Field of Search .............. 29/157 R, 428, 429; 242/86.5 R, 86.7, 86.6, 86, 86.61, 86.62, 86.63, 86.64; 254/134.3 R; 175.5; 61/72.1, 72.6

[56] References Cited
UNITED STATES PATENTS

| | | | |
|---|---|---|---|
| 3,367,600 | 2/1968 | Olson | 242/86.7 |
| 3,473,755 | 10/1969 | Brown | 242/86.52 |
| 3,531,059 | 9/1970 | Walker | 242/86.5 R |
| 3,739,985 | 6/1973 | Odom et al. | 242/86.5 R |
| 3,855,807 | 12/1974 | Grable | 61/72.1 |

*Primary Examiner*—Milton S. Mehr
*Assistant Examiner*—Dan C. Crane
*Attorney, Agent, or Firm*—Wendell Coffee

[57] ABSTRACT

Flexible plastic pipe is reeled onto a reel mounted on a truck and is temporarily laid on a field site by driving the truck along, permitting the flexible pipe to unreel. A brake on the reel puts tension on the flexible pipe as it is being unreeled. To retrieve the flexible pipe, it is cut into segments, each segment being of a shorter length than the total amount of flexible pipe reeled onto the reel. Then, each segment is reeled onto the reel with the truck stationary and the reel driven through a transmission from the truck.

4 Claims, 6 Drawing Figures

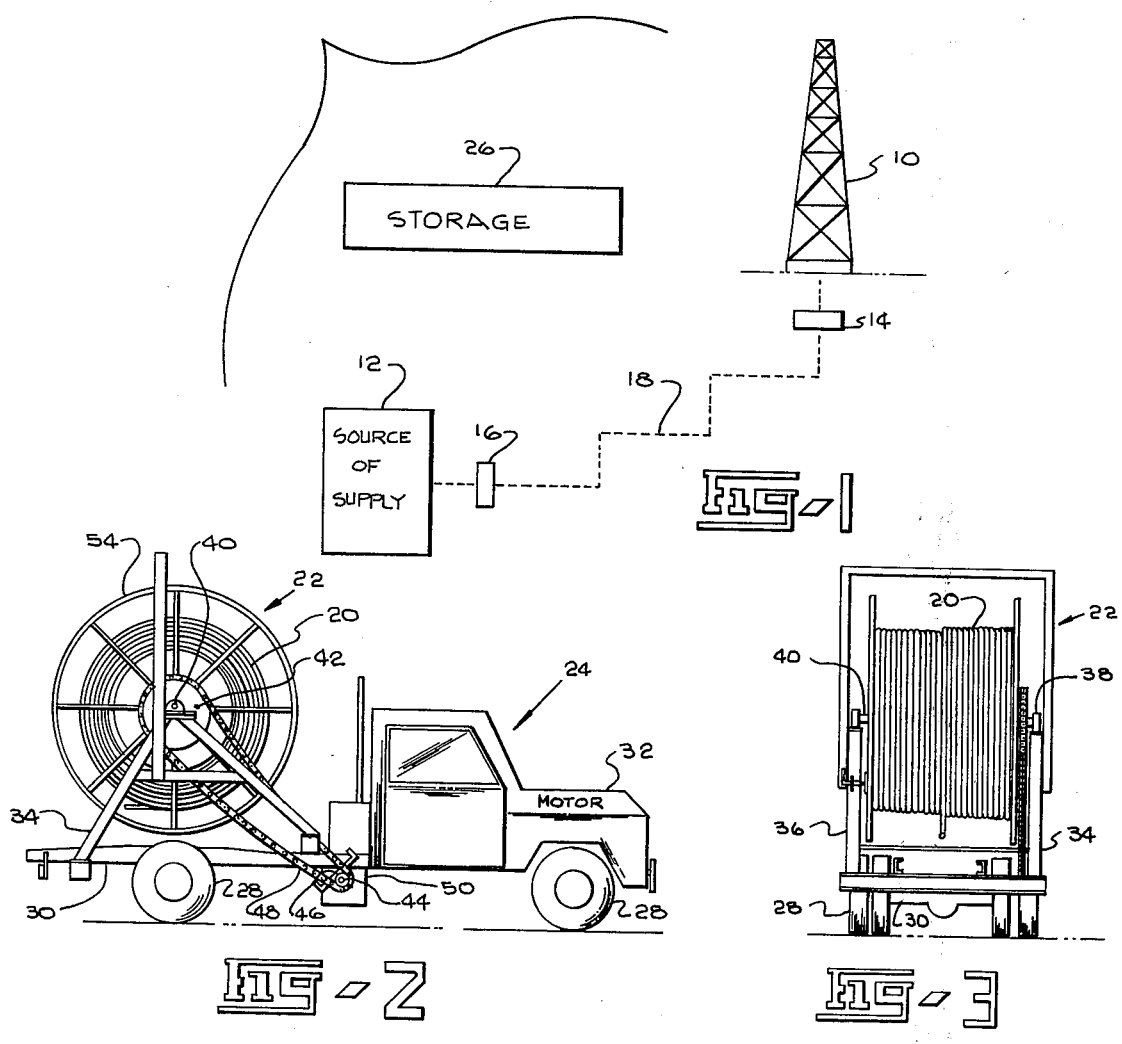

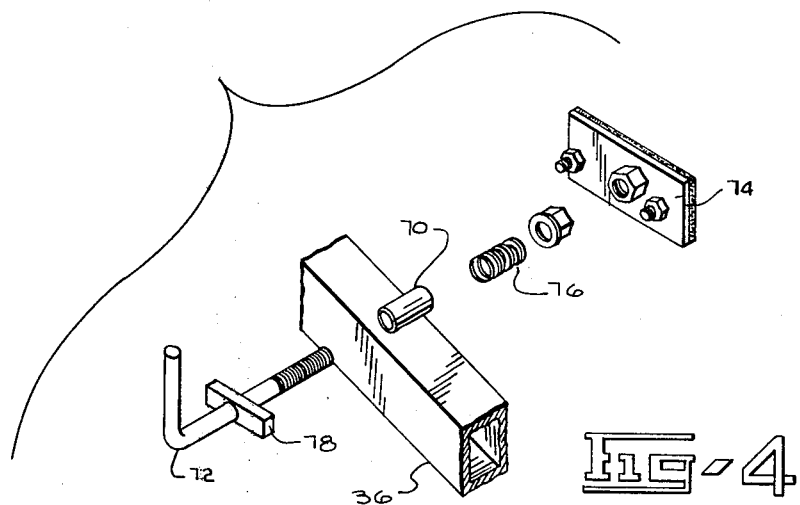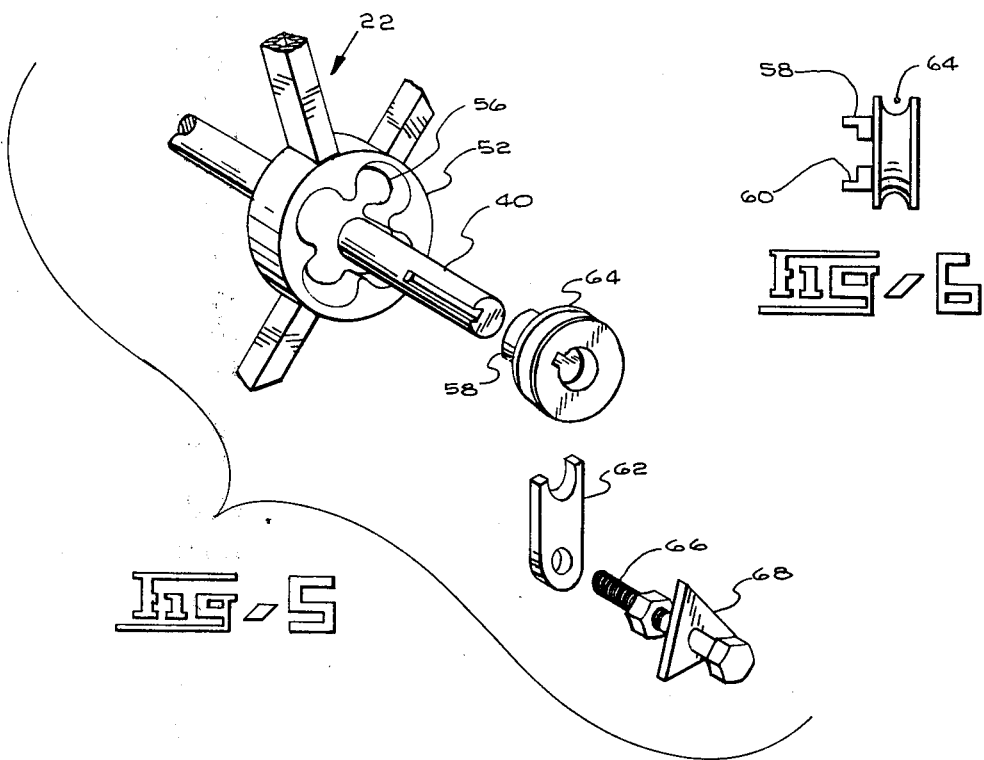

LAYING OF FLEXIBLE PIPE

BACKGROUND OF THE INVENTION:

1. Field of the Invention.

This invention relates to laying flexible pipe from a reel and retrieving same to the reel.

2. Description of the Prior Art.

In the drilling of oil wells, it is necessary that the well be supplied with water and, also, be supplied with a fuel. At the present time, the most economical and, therefore, desirable fuel is natural gas. The terminal offering a source of supply of water and natural gas is often as much as three kilometers away. Experience has shown that water or gas supplied under pressure in a pipe about 5 cm in diameter is sufficient to supply a drilling rig while in operation.

At the time this invention was made, the customary commercial practice of supplying the drilling rig with water and gas was to connect segments of pipe approximately 10 meters long by hand coupling. It will be understood that this required a great number of joints, each of which were hand coupled. At the time of this invention there was flexible pipe made of plastic (the common commercial name for synthetic resin pipe) was available. Also, there was complete technology available and machines available for coupling two segments of the plastic pipe by fusion welding.

SUMMARY OF THE INVENTION:

1. New and Different Function.

This invention provides a means and procedures for greatly reducing the labor required to lay and retrieve temporary pipe from a source of supply of water to the drilling rig and a source of supply of fuel gas under pressure to the drilling rig. This is done by placing about 2000 meters of 5 cm diameter flexible pipe upon reels mounted upon trucks and driving the trucks along the route permitting the flexible pipe to spool off the back. A brake maintains tension on the pipe to prevent the pipe from "snaking".

On retrieving the pipe the flexible pipe is first cut into segments, each segment being about 500 meters. Then, the pipe is reel-drawn to the truck and wound onto the reel with the truck stationary. In the event the terrain is regular and the surface of the earth is sandy so the pipe slips well, longer segments of pipe, e.g., about 700 meters, may be used. Also, it will be understood that if the route of the line is around right-angle corners to follow the existing roads or the like, normally, the pipe will be cut at these corners. After one segment of pipe is wound onto the reel, the truck is driven to the next segment, it attached to the portion already on the reel and continued. Once the pipe is retrieved from the field site, it may either be returned to a storage area or taken to the next job or field site.

2. Objects of this Invention.

An object of this invention is to provide water and fuel gas at a drilling rig.

Another object is to lay temporary pipe from a source of supply of these fluids to a drilling rig.

Yet another object of the invention is to provide machinery for accomplishing the above.

Other objects are to achieve the above with a device that is sturdy, compact, durable, lightweight, simple, safe, efficient, versatile, and reliable, yet inexpensive and easy to manufacture, adjust, operate, and maintain.

Further objects are to achieve the above with a method that is versatile, rapid, efficient, and inexpensive, and does not require skilled people to install, adjust, operate, and maintain.

The specific nature of the invention, as well as other objects uses, and advantages thereof, will clearly appear from the following description and from the accompanying drawing, the different views of which are not necessarily to the same scale.

BRIEF DESCRIPTION OF THE DRAWING:

FIG. 1 is a schematic representation of the route from supply to drilling rig with storage area.

FIG. 2 is a side elevational view of a truck with equipment according to an embodiment of this invention.

FIG. 3 is a back elevational view of the truck of FIG. 2.

FIG. 4 is an exploded perspective view of the brake.

FIG. 5 is an exploded perspective view of the clutch.

FIG. 6 is an elevational detail of the clutch sleeve.

DESCRIPTION OF THE PREFERRED EMBODIMENT:

Referring to the drawing and more particularly to FIG. 1, it may be seen there represented in schematic fashion drilling rig 10 to which it is desired to run a supply of water under pressure from a source of supply 12. It will be understood that at the drilling rig there is drilling rig terminal 14 where the water is to be used and, thus, called a "use terminal". At the source of supply there is source terminal 16. There also may be existing roads so it is desirable to follow route 18.

To accomplish this connection at the field site, flexible plastic pipe 20 is placed upon vehicle reel 22 mounted upon wheeled vehicles or truck 24. Then the end of the pipe 20 is connected for fluid transmission by fusion welding, the procedures and processes of which are well known, to one or the other terminals 14 and 16, then the truck 24 is driven along the route 18, thus, unreeling the flexible pipe 20. This is continued until all of the pipe is unreeled. When all of the pipe is unreeled the truck is driven to a storage area 26 and additional flexible pipe 20 is reeled onto the reel 22 at that point. Then, the truck 24 is returned to the field site and the flexible pipe on the reel 22 is attached by fusing to the pipe already laid along the route 18. The truck then moves along the route, laying additional pipe, and this procedure is continued until the other of the terminals 14 or 16 is reached. At that point, of course, the flexible pipe is connected thereto by conventional means.

After the operations at the drilling rig 10 have been completed, which is to say after the well has been completed, the flexible pipe 20 is ready to be retrieved and either returned to the storage area 26 or moved to the next drilling rig area. To do this, the pipe will be cut into segments, each segment being about 500 meters in length or a length extending from a terminal to a corner or the distance from one corner to another if the distance is less than 500 meters in length. The determining factor, of course, is whether the pipe 20 can be pulled around the corner or whether the segment is so long that it cannot readily be reeled upon the reel 22. It will be understood that each of the segments of the flexible pipe 20 will be substantially less than the capacity of the reel, the capacity of the reel being such that it would hold about 2000 meters of the pipe 20.

After the pipe is cut into convenient segments, it is retrieved by connecting one of the segments to the reel 22 and with the truck stationary, retrieving the flexible pipe 20 upon the reel 22. When each segment has been retrieved, the truck is driven to the next segment and the next segment is fused to the flexible pipe already upon the reel and that segment is reeled in. This is continued until the reel is full of flexible pipe. At that time the truck is driven to a location where the flexible pipe is to be unreeled. It may be understood that this might either be the storage area 26 or the next field site where the flexible pipe is to be extended from a terminal 16 at a source of supply to a terminal 14 at another drilling rig. There the pipe is unreeled from the truck as described above and the truck returned to where the pipe is being picked up and this process is continued until all of the pipe is picked up and moved.

Describing more particulary the vehicle or the truck 24 upon which the reel 22 is mounted, it will be understood it has ground engaging wheels 28 for supporting truck frame 30. It will be understood, of course, that the truck has a motor 32 and that there is the conventional transmission or drive means mounted on the frame for driving the wheels 28 from the motor 32. Upon this truck, two A supports are provided—drive A support 34 is on the right side and clutch A support 36 is on the left side of the frame 30. These supports 34 and 36 are call A supports because in elevation, they resemble the letter A. The bottom of the legs are attached as by bolting or welding to the truck frame 30. The apex of each A support 34 and 36 has pillow block bearing 38 through which is journaled axle 40. Therefore, it may be seen that the axle will extend from the drive A support 34 to the clutch A support 36 and is journaled to each of the A supports.

Sprocket 42 is attached to the axle 40 at the drive A support 34. Power take off 50 is mounted upon the truck frame 30. These power take offs are well known to the art and we have found it desirable to have a power take off having a 9-1 speed reduction. For example, output shaft 44 will have a rotational speed of 1/9th of the rotational speed of the point to which it is attached to the truck transmission. Also it will be understood that the shaft 44 is parallel to the axis of the wheels 28 and, also, parallel to the axis of axle 40. Shaft sprocket 46 is attached to shaft 44 and chain 48 extends from the shaft sprocket 46 to the axle 42, thereby, driving the axle sprocket at any time the power take off or reel drive means 50 is engaged. It will be understood, of course, that the reel drive means is means for rotating the shaft 44. Reel 22 is journaled onto the axle 40 between the drive A support and the clutch A support. The reel 22 has hub 52 and rim 54.

The hub 52 of the reel 22 adjacent to the clutch A support has a clover-leaf cutout 56 therein. Sleeve 58 is keyed to the axle 40 at the clutch A support 36. The sleeve 58 is mounted for translation or axial movement upon the axle, but being keyed to the axle, it rotates therewith. The sleeve has notches 60 thereon which mate the clover-leaf cutout 56 upon the hub 52. Therefore, a clutch is formed so that if the notches are engaged with the clover-leaf, the clutch is engaged and the reel 22 will rotate with the axle 40. However, if the notches 60 of the sleeve 58 are withdrawn from the clover-leaf 56, the reel will turn freely upon the axle 40.

Fork 62 engages a circumferential groove 64 in the sleeve 58 to move the sleeve. Threaded bolt 66 is threaded through plate 68 on the clutch A support 36 and has washers thereon mounted on either side of the fork 62. Thus, it may be seen that by rotating the bolt 66, the fork 62 may be moved back and forth and by the engagement in the groove 64, the clutch may be moved into and out of engagement with the reel 22. Thus, a clutch is provided at the clutch A support 36 interconnecting the axle and reel.

Tube 70 is welded to the clutch A support opposite of the rim 54 of the reel 22. Rod 72 extends through the tube 70. Brake shoe 74 is attached to the rod adjacent to the rim 54 of the reel. Helical compression spring 76 extends from the shoe to the tube 70 around the rod 72, thus, biasing the shoe against the rim with a steady, braking pressure. I.e., when the shoe is against the rim, the spring will cause a constant tension or constant drag applied to the reel so that as the flexible pipe 20 is reeled from the reel with the clutch disengaged, a steady tension is maintained upon the flexible pipe, keeping it from "snaking" or wiggling from side to side as it is being unreeled. A lock means in the form of crossbar 78 is welded onto the rod 72 so that rotation of the crossbar 78 will bear against a portion of the clutch A support 36 to pull the brake shoe 74 away from the rim 54, thus, releasing the brake. The brake is released when the pipe is being reeled in, which will be when the clutch is engaged and the power takeoff or the shaft 44 rotating.

Thus, it may be seen that the objects are achieved for providing temporary pipe to a drill rig and for retrieving it and moving it to another location.

As an aid to correlating the terms of the claims to the exemplary drawing, the follow catalog of elements is provided:

| | | | |
|---|---|---|---|
| 10 | drill rig | 46 | sprocket, shaft |
| 12 | source of supply | 48 | chain |
| 14 | terminal, rig | 50 | reel drive means(power take-off) |
| 16 | terminal, source | 52 | hub |
| 18 | route | 54 | rim |
| 20 | flexible pipe | 56 | clover leaf |
| 22 | reel | 58 | sleeve |
| 24 | truck | 60 | notches |
| 26 | storage area | 62 | fork |
| 28 | wheels | 64 | groove |
| 30 | truck frame | 66 | bolt |
| 32 | motor | 68 | plate |
| 34 | drive "A" support | 70 | tube |
| 36 | clutch "A" support | 72 | rod |
| 38 | pillow block | 74 | shoe |
| 40 | axle | 76 | spring |
| 42 | sprocket, axle | 78 | crossbar |
| 44 | shaft | | |

The embodiment shown and described above is only exemplary. We do not claim to have invented all the parts, elements or steps described. Various modifications can be made in the construction, material, arrangement, and operation, and still be within the scope of our invention. The limits of the invention and the bounds of patent protection are measured by and defined in the following claims. The restrictive description and drawing of the specific example above do not point out what an infringement of this patent would be, but are to enable the reader to make and use the invention.

We claim:

1. The method of temporarily connecting at a field site a supply terminal of a source of supply of fluid under pressure to a use terminal comprising:

a. placing flexible plastic pipe upon a vehicle reel mounted upon a wheeled vehicle.

b. connecting the flexible pipe for fluid transmission to one of said terminals,
c. moving the vehicle, thus
d. unreeling the flexible pipe from the reel,
e. connecting additional flexible pipe on a reel on the vehicle for fluid transmission to that already laid, thereafter,
f. moving the vehicle, thus
g. laying additional pipe,
h. continuing the steps of d), e), and f) until the other terminal is reached,
j. connecting the flexible pipe for fluid transmission to said other terminal;
k. thereafter, retrieving the temporarily laid flexible pipe by
m. severing the flexible pipe into segments, the length of each segment of pipe being less than the length of flexible pipe filling one reel,
n. attaching a segment of flexible pipe to the vehicle reel,
o. reeling the attached segment onto the vehicle reel,
p. moving the vehicle to another segment of flexible pipe, and
q. attaching said another segment to the segment of pipe already on the reel, and
r. reeling said another segment onto the vehicle reel,
s. continuing the steps p), q), and r), until the reel is full,
t. unreeling the pipe from the reel, and
u. continuing the steps n), o), p), q), r), s), and t), until all the segmented pipe is retrieved.

2. The invention as defined in claim 1 wherein only one reel is used and, therefore, the additional flexible pipe, as recited in step e), is connected to said vehicle reel.

3. The method of temporarily connecting at a field site an oil drilling rig terminal to a terminal of source of supply of water and of fuel gas under pressure comprising:
   a. placing flexible plastic pipe upon a reel mounted upon a truck,
   b. connecting by fusion the flexible pipe to one of said terminals,
   c. driving the truck, thus
   d. unreeling the flexible pipe until all the flexible pipe is unreeled from the reel,
   e. going to a source of supply of additional flexible pipe,
   f. reeling additional flexible pipe onto the reel,
   g. returning to the field site,
   h. fusing the flexible pipe from the reel to that already laid, thereafter
   j. moving the truck, thus
   k. laying additional pipe,
   m. continuing the steps of d), e), f), g), h), and j), above until the other of said terminal is reached,
   n. fusing the flexible pipe to said other terminal;
   o. thereafter, retrieving the temporarily laid flexible pipe by
   p. severing the flexible pipe into segments, the length of each segment of pipe being less than the length of flexible pipe filling one reel,
   q. attaching a segment of flexible pipe to the reel, and with the truck stationary,
   r. reeling the segment of flexible pipe onto the reel,
   s. driving the truck to the next segment of flexible pipe, and
   t. attaching that said segment of flexible pipe to the flexible pipe already on the reel and
   u. reeling it up,
   v. continuing the steps of s), t), and u), above until the reel is full of flexible pipe,
   w. driving to where the flexible pipe is to be unreeled, and
   x. unreeling the pipe, and thereafter
   y. returning to the field site, and
   z. continuing the steps q), r), s), t), u), v), w), and x), above until all the pipe is retrieved.

4. The invention as defined in claim 3 with the additional step wherein the retrieved pipe is unreeled from the reel by attaching the flexible pipe to a fixed position and driving the truck away from the pipe.

* * * * *